Sept. 23, 1941.　　　J. P. MURTAUGH　　　2,256,488
REPLACEABLE TOOTH FOR DIPPERS
Filed June 22, 1938
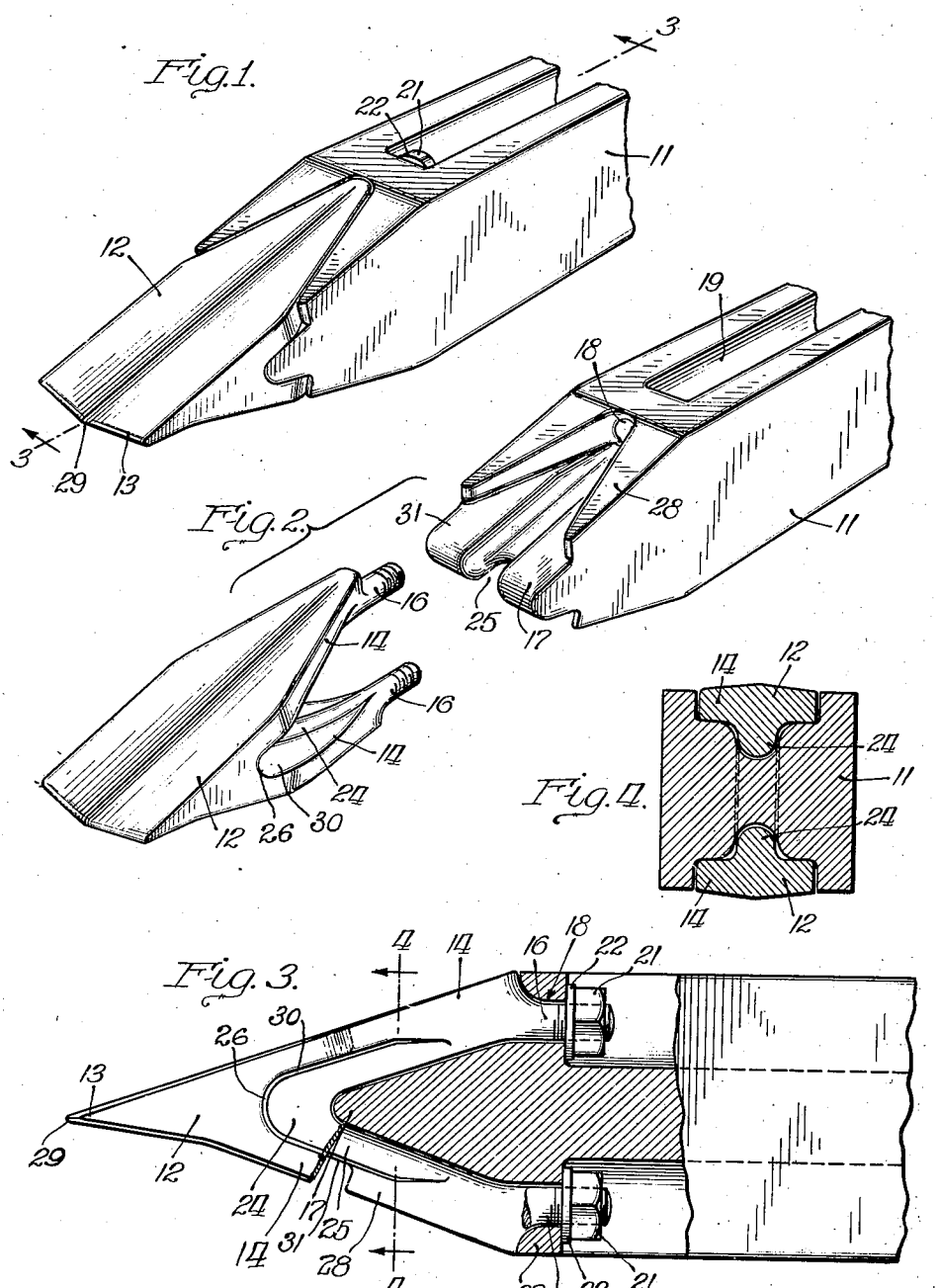
INVENTOR.
Joseph P. Murtaugh
BY Louis Robertson
ATTORNEY.

Patented Sept. 23, 1941

2,256,488

UNITED STATES PATENT OFFICE 2,256,488

REPLACEABLE TOOTH FOR DIPPERS

Joseph P. Murtaugh, Chicago Heights, Ill., assignor to Daniels-Murtaugh Company, Cedar Rapids, Iowa, a partnership comprising Arthur W. Daniels and Joseph P. Murtaugh Application June 22, 1938, Serial No. 215,104

10 Claims. (Cl. 37—142)

A vast amount of inventive effort has been directed heretofore toward the provision of replaceable teeth for excavating dippers of power excavating machines such as steam shovels. Many types of such replacement teeth have been provided but few if any of them have been entirely satisfactory. One of their most common faults is in becoming slightly loose in use. This is very objectionable partly because, once they become loose, hammer-like blows are delivered to various portions of the tooth and its shank or base as they come in contact and this is likely to damage such portions. Furthermore, other portions, particularly the retaining portions, are subjected to much higher strains and stresses than they would otherwise be required to withstand. As a result there has either been frequent breakage or the parts have been made extremely heavy so as to withstand the abnormal destructive forces to which they would not be subjected if the parts remained tight. This in turn has greatly increased the cost of such detachable teeth due to the extra material required. Furthermore, the weight of this material necessarily decreases by an equal amount the useful load which could be handled by any given power equipment.

Another fault which has been very common in replaceable teeth heretofore has been that they have become easily dulled. They were usually designed in such configurations that in commercial production they had to be cast and, although tough alloys were used in casting them, such alloys are characterized by a lack of initial hardness. Although some of them were hardened by the pounding received on the points, the points were considerably dulled before this hardening became effective.

According to the present invention these defects are simultaneously overcome by the use of a forged steel tooth which can be satisfactorily hardened at its point and which is so designed as to make commercial manufacture practical and to prevent the accidental loosening of the tooth while making it easily replaceable. The prevention of loosening is accomplished by making the tooth somewhat in the form of a U-bolt having integral threaded portions and tightening it up with nuts so that it is under a constant state of elastic tension and so that there is no loosening of the securing means by blows received thereon. As a result the securing portions of the tooth can be made relatively light since the tooth, making use of the permanent tightness thereof, is designed to relieve the securing portions of most of the load applied to the tooth. The lightness of the securing portions in turn permits a reduction in size or an increased slimness of the tooth throughout inasmuch as the necessary taper of the tooth requires that its entire size be somewhat proportional to the size of the securing portions thereof.

Although the invention makes possible the satisfactory forging of a practical tooth, it will be observed that the tooth has inherent advantages which would be useful in teeth that are not forged, particularly in obtaining, in combination with the nose on which it is secured, a surprisingly high strength with a given amount of metal and in being firmly locked laterally without wasting metal to accomplish the locking.

Additional objects and advantages of the invention will be apparent from the following description and from the drawing, in which:

Fig. 1 is a fragmentary perspective view of the form of the invention chosen for illustration.

Fig. 2 is a fragmentary exploded perspective view corresponding to Fig. 1, but somewhat schematic as to details.

Fig. 3 is a fragmentary longitudinal center section taken approximately on the line 3—3 of Fig. 1 but showing the details of the preferred shape more accurately.

Fig. 4 is a cross section taken approximately on the line 4—4 of Fig. 3.

Although this invention may take various forms, only one has been chosen for illustration. In this form the construction includes a tooth base or shank 11 which may be a replaceable or integral extension of the dipper front, and a tooth 12 removably secured to the base 11. Sometimes the entire illustrated structure including the base 11 and the tooth 12 is called a tooth and the portion 12 is called a point. In this application, however, the term "point" will be used for the tip portion 13 of the tooth 12.

The structure is quite simple and can be seen fairly clearly from the drawing. The tooth 12 has two side portions or legs 14, each of which includes a threaded rearward extension 16. The side portions 14 are complemental to a generally V-shaped nose 17 of the base 11. The extensions 16 pass through holes 18 in the base 11 and into the open channels 19, the holes 18 and channels 19 comprising sockets. Nuts 21, preferably with washers 22, may be applied to the extensions 16 to draw the tooth 12 tight onto the nose 17.

In order to make possible the use of the threaded extensions 16 and the nuts 21, the tooth 12 is made of a machinable metal having high tensile strength and preferably a high elastic limit and the ability to be satisfactorily hardened at its point. Although there are various metals which will meet these requirements, that preferred is a type known as chrome molybdenum steel. The steel identified as S. A. E. 4140 has been found satisfactory, but of course considerable departure may be made from the formula thereof. Many chrome nickel and chrome vanadium steels would also be satisfactory. The shank 11 may be cast in the usual way from customary metals, such as manganese steel. The chrome molybdenum steel, of which the tooth is preferably formed, has a tensile strength and an elastic limit approximately twice the tensile strength and elastic limit of the manganese steel. Its point, furthermore, may be prehardened to a degree of hardness corresponding approximately to the hardness obtained by manganese steel after use. This hardness is approximately 400 Brinell. It is very advantageous to have a point which is prehardened to this degree since it enables the point to stay sharp much longer than it would otherwise. Former manganese steel points obtained this hardness only after considerable pounding, by which time they were greatly dulled. The prehardening of the point of this invention may of course be accomplished by suitable heat treatment, such heat treatments being well known in the metallurgical art.

It will be observed that the tooth 12 is generally V-shaped in cross section and that the nose 17 is complementally shaped. The result is that the parts will fit sufficiently well without machining. When the nuts 21 are tightened, they will first draw the tooth 12 into a tight engagement with the nose 17 and they will then place the extension 16 and in fact the whole of the side portions 14 in a state of elastic tension. In view of the high elastic limit and tensile strength of the metal, this constant elastic tension may be quite high. This constant elastic tension ordinarily prevents any looseness from appearing between the tooth 12 and the nose 17, but of course if such looseness should appear it may simply be taken up by tightening the nuts 21 to again place the extensions 16 under elastic tension. It will be observed that the nuts 21 are well protected within the channel 19 so that they will not receive any loosening blows. There have been various constructions before which were intended to draw the tooth tightly onto the nose. These constructions have failed to give complete satisfaction because they would become loose. Sometimes the loosening was due to blows received directly on the retaining member such as a retaining wedge, and sometimes the loosening was due initially to a lack of elastic tension which permitted a very slight amount of looseness to appear. Any slight amount of looseness would usually increase rather rapidly under the pounding effect between the parts which are loose. The elastic tension which is made possible in the present invention by the combination of the high tensile strength and the threaded nuts 21 prevents the initial looseness from appearing, and hence gives no opportunity for the increased looseness due to a pounding effect.

Another important result of holding the tooth on the nose with dependable tightness is that practically all of the load applied to the tooth 12 will be transmitted by it to the nose 17 due to the nature of the fit between the nose 17 and the tooth 12. Thus, a vertical force applied to the point 13 in Fig. 3 would not put any extremely high additional strain longitudinally of the extensions 16 but instead would produce a spreading tendency between the side portions 14 of the tooth 12. If the side portions or legs 14 could spread, the extensions 16 might have to withstand considerable additional force. Spreading of the side portions 14 is prevented largely by a web 24 which extends into a groove 25 in nose 17, connecting the legs 14 for a substantial distance rearwardly from the crotch 26 from which they diverge. Although this bracing web 24 is centrally positioned transversely of the tooth 12, there could instead, except for difficulties of forging, be two such webs at opposite sides of the tooth 12, the nose 17 being complementarily shaped to receive them. The web 24 and the groove 25 serve the additional function of preventing any lateral shirting of the tooth 12 on the nose 17. To resist better such lateral forces the web 24 extends rearwardly along the length of the side portions 14. As a matter of fact, the threaded extensions 16 are practically extensions of this web 24. This has the advantage of positioning them well within the confines of the taper of the tooth so that the bridges forming the outer walls 27 of the holes 18 may be adequately strong. It will be observed that these walls will, if necessary, brace the side portions 14 against spreading.

To take full advantage of high-strength machinable metal it is necessary to forge such metal in order to develop its full strength. In order to make manufacture thoroughly practical and commercially desirable, it is therefore necessary that the tooth be so designed that it may be forged readily and therefore economically. The illustrated form of tooth may be forged quite easily. Features which contribute to the ease of forging are the provision of a single web 24 at the interior of the tooth instead of having two such webs on the sides, and the shaping of the sides 14 with a rearwardly tapering configuration as seen clearly in Fig. 2. This tapering configuration greatly facilitates the drawing out of the extensions 16 by forging. Likewise, the point of the tooth, instead of lying along a straight edge, is tapered to a point 29 and the faces of the tooth are similarly tapered. The shape shown can be forged with a single heating and a single set-up. The shape of the point also improves the action of the tooth in use.

The tapered shape of the legs 14 is also desirable because it permits the provision of the corner shoulders 28 on the base 11 complemental to the taper of the legs 14. These corner shoulders brace the base 11 somewhat and also serve as safeguards against lateral movement of the legs 14 with respect to the base 11. The complemental shaping of the tooth 12 and the base 11 is desirable in itself because it tends to minimize the presence of shoulders which may strike rocks or the like in the use of the dipper.

From Figure 3 it will be observed that the inner face 30 is tapered from the web 24 laterally to the sides of the tooth. In other words, the inner faces of the diverging legs 14 slope laterally away from each other from an intermediate portion of the tooth to its sides. Likewise, it is seen from the lower portion of the same figure that the outer face 31 of the front portion of nose 17 is correspondingly tapered laterally. When the tooth is drawn tight on the nose it is firmly locked by these sloping faces against lateral displacement, even though there may be clearance between web 24 and groove 25.

From the foregoing it is seen that a forged prehardened removable tooth is provided having a construction which makes commercial forging possible and which is drawn tight on the nose of the base by nuts whereby the retaining extensions of the tooth are placed under elastic tension to prevent any initial loosening of the tooth and hence to prevent the tooth from being subjected to deteriorating hammer-like blows or to excessive strains or stresses. Because of the permanently tight fit and the avoidance of excessive strains and stresses the securing portions of the tooth are made relatively small in size and hence the entire tooth may likewise be relatively small in size and considerable weight saved. This represents a saving in the cost of manufacture and also a saving in the total power consuming weight of the empty dipper.

The disclosures of this application are illustrative and the invention is not to be limited by them. In fact, if modifications or improvements are not at once obvious, they may be devised in the course of time to make additional use of the broad ideas taught and covered by this application. The claims are intended to point out novel features and not to limit the invention except as may be required by prior art.

I claim:

1. A tooth and base structure for dippers and the like, including a cast base having a projecting nose, and a forged tooth substantially in the form of a U-bolt, having a hardened point and having its ends threaded and both drawn into the base with nuts to draw the tooth at both legs of the U tightly in engagement with the nose, the nose and the legs of the tooth interlocking so as to prevent spreading of the legs of the tooth and being so shaped that the forces applied to the tooth are largely transmitted to the base independently of the securing nuts.

2. A tooth and base structure for dippers and the like, including a cast base having a projecting nose, and a forged tooth substantially in the form of a U-bolt, having a hardened point and having its ends threaded and both drawn into the base with nuts to draw the tooth at both legs of the U tightly in engagement with the nose, the nose and the legs of the tooth interlocking so as to prevent spreading of the legs of the tooth and being so shaped that the forces applied to the tooth are largely transmitted to the base independently of the securing nuts, said tooth having a single internal flange extending inwardly of the nose for bracing the tooth against spreading of its legs and for preventing lateral movement of the tooth with respect to the nose.

3. A tooth and base structure for dippers and the like, including a cast base having a projecting nose, and a tooth substantially in the form of a U-bolt, having a prehardened point and having its ends threaded and both drawn into the base with nuts to draw the tooth at both legs of the U tightly in engagement with the nose, the nose and the legs of the tooth interlocking so as to prevent spreading of the legs of the tooth and being so shaped that the forces applied to the tooth are largely transmitted to the base independently of the securing nuts, the tooth being tapered from its legs toward its point and each leg of the tooth being tapered from a mid portion of the tooth toward the threaded portion thereof to facilitate forging, and said nose having reinforcing extensions complementary to the taper of the legs of the tooth.

4. A tooth for dippers and the like, comprising a body portion having generally opposite faces converging toward a point, and integral leg portions extending and diverging rearwardly from the body portion to fit over, bear on and protect from wear a complementally shaped projecting nose of a base, said leg portions including parts of said opposite faces of the tooth being tapered in width, as seen from the direction in which the leg portions are aligned, from approximately their point of separation rearwardly, and means adapted to project into the base and to be drawn therewithin by securing means; said tooth including means for preventing the spreading apart of said leg portions, and the inner faces of the leg portions being adapted to bear on the top and bottom of the front portion of the nose and sloping away from each other toward the sides from an intermediate portion whereby the tooth will be interlocked against lateral movement on a correspondingly shaped nose.

5. A tooth and base structure for dippers and the like, including a cast base having a projecting nose, and a tooth substantially in the form of a U, having a pre-hardened point and having its ends both drawn into the base with securing means to draw the tooth at both legs of the U tightly in engagement with the nose, the nose and the legs of the tooth interlocking in advance of the securing means so as to prevent spreading of the legs of the tooth and being so shaped that the forces applied to the tooth are largely transmitted to the base independently of the securing means, the tooth being tapered from its legs toward its point and each leg of the tooth being tapered from a mid portion of the tooth toward the securing portion thereof to facilitate forging, and said nose having reinforcing extensions complementary to the taper of the legs of the tooth.

6. A tooth for dippers and the like, comprising a body portion adapted to receive a nose therein and to lie above and below the nose and having generally opposite faces converging toward a point and integral securing shanks extending rearwardly from the body portion to extend within a tooth base and adapted to be drawn into the base for securing the tooth firmly thereon; said tooth, including said opposite faces, being tapered in width as seen from directions perpendicular to the faces, approximately from the portion of the tooth adapted to receive the point of the nose to the shanks, and the inner faces of the portions adapted to lie above and below the nose being adapted to bear on the top and bottom of the front portion of the nose and sloping away from each other toward the sides from an intermediate portion whereby the tooth will be interlocked against lateral movement on a correspondingly shaped nose.

7. A tooth for dippers and the like, comprising a body portion adapted to receive a nose therein, having rearwardly diverging inner faces adapted to bear on the upper and lower faces of the front of the nose and having generally opposite outer faces converging toward a point, and securing shank means integral with the body portion and adapted to extend rearwardly within a tooth base and provided with a formation adapting the shank means associated with said formation to be drawn into the base for securing a tooth firmly thereon; said tooth, including said opposite outer faces, being progressively reduced rearwardly in width, as seen from directions perpendicular to the faces, along a portion overlapping the nose and forwardly of the said formation, and said inner faces sloping away from each other toward the sides from an intermediate portion whereby the tooth will be interlocked against lateral movement on a complementally shaped nose.

8. A tooth for dippers and the like, comprising a body portion adapted to receive a nose therein, having rearwardly diverging inner faces adapted to bear on the upper and lower faces of the nose and having generally opposite outer faces converging toward a point, and securing shank means integral with the body portion and adapted to extend rearwardly within a tooth base and provided with a formation adapting the shank means associated with said formation to be drawn into the base for securing a tooth firmly thereon; said tooth, including said opposite outer faces, being progressively reduced rearwardly in width, as seen from directions perpendicular to the faces, along a portion overlapping the nose and forwardly of the said formation, said inner faces sloping away from each other toward the sides from an intermediate portion whereby the tooth will be interlocked against lateral movement on a complementally shaped nose, and said tooth including means for preventing the spreading apart of the portions of the tooth lying above and below the nose.

9. A tooth for dippers and the like, comprising a body portion adapted to receive a nose therein, with portions of the tooth lying above and below the nose, having rearwardly diverging inner faces adapted to bear on the upper and lower faces of the front of the nose and having generally opposite outer faces converging toward a point, and securing shank means integral with the body portion and adapted to extend rearwardly within a tooth base and provided with a formation rearwardly of the outer faces adapting the shank means associated with said formation to be drawn into the base for securing a tooth firmly thereon, said inner faces sloping away from each other toward the sides from intermediate portions of the tooth, whereby the tooth will be interlocked against lateral movement on a complementally shaped nose, said intermediate portion being thicker than the adjacent side portions and said tooth including means integral therewith at said intermediate portions for preventing the spreading apart of the portions adapted to lie above and below the nose.

10. A tooth for dippers and the like, comprising a body portion adapted to receive a nose therein, having rearwardly diverging inner faces adapted to bear on the upper and lower faces of the nose and having generally opposite outer faces converging toward a point, and securing shank means integral with the body portion and adapted to extend rearwardly within a tooth base and provided with a formation positioned rearwardly of said outer faces adapting the shank means associated with said formation to be drawn into the base for securing a tooth firmly thereon, said inner faces sloping away from each other toward the sides from an intermediate portion whereby the tooth will be interlocked against lateral movement on a complementally shaped nose, and said tooth including means for preventing the spreading apart of the portions of the tooth lying above and below the nose, including a web connecting said portions at said intermediate portion where they are thickest, and a complementally shaped nose on which said inner laterally sloping faces bear, said nose and tooth being shaped to provide clearance between any surfaces, contact of which would prevent said inner sloping faces from bearing on the corresponding faces of the nose, and said nose being sufficiently sturdy to resist spreading forces applied thereto by said outwardly sloping surfaces.

JOSEPH P. MURTAUGH.